(12) United States Patent
Peng et al.

(10) Patent No.: US 10,664,286 B2
(45) Date of Patent: May 26, 2020

(54) ENHANCED PERFORMANCE FOR GRAPHICAL PROCESSING UNIT TRANSACTIONAL MEMORY

(71) Applicants: Lu Peng, Baton Rouge, LA (US); Sui Chen, Sunnyvale, CA (US)

(72) Inventors: Lu Peng, Baton Rouge, LA (US); Sui Chen, Sunnyvale, CA (US)

(73) Assignee: BOARD OF SUPERVISORS OF LOUISIANA STATE UNIVERSITY AND AGRICULTURAL AND MECHANICAL COLLEGE, Baton Rouge, LA (US)

( * ) Notice: Subject to any disclaimer, the term of this patent is extended or adjusted under 35 U.S.C. 154(b) by 0 days.

(21) Appl. No.: 15/920,157

(22) Filed: Mar. 13, 2018

(65) Prior Publication Data

US 2018/0260231 A1 Sep. 13, 2018

Related U.S. Application Data

(60) Provisional application No. 62/470,627, filed on Mar. 13, 2017.

(51) Int. Cl.
*G06F 9/38* (2018.01)
*G06F 9/30* (2018.01)
(Continued)

(52) U.S. Cl.
CPC ........ *G06F 9/3887* (2013.01); *G06F 9/30043* (2013.01); *G06F 9/467* (2013.01); *G06F 15/8007* (2013.01)

(58) Field of Classification Search
None
See application file for complete search history.

(56) References Cited

U.S. PATENT DOCUMENTS 5,701,480 A * 12/1997 Raz .................. G06F 9/466
714/19
9,535,815 B2 * 1/2017 Smith ............... G06F 11/3636
(Continued)

OTHER PUBLICATIONS

Chen et al., "Efficient GPU Hardware Transactional Memory Through Early Conflict Resolution," LSU, 2016, pp. 1-11.
(Continued)

*Primary Examiner* — Eric Coleman
(74) *Attorney, Agent, or Firm* — Workman Nydegger

(57) ABSTRACT

A computer system implementing transactional memory. The computing system includes a plurality of Single Instruction Multiple Thread (SIMT) cores and a conflicting address table (CAT) for each core. The CAT stores word addresses for reads and writes correlated with flags indicating whether a corresponding word is written or read by a committing transaction. The CATs for the different SIMT cores are coupled together by an interconnect. A commit unit (CU) is coupled to the SIMT cores and is configured to validate transactions. The cores access its CAT to access a first address of data affected by a first transaction to be committed at the CU. The first address is compared to a second address affected by a second transaction. When the first address matches the second address, the core delays or prevents committing the first transaction at the CU by pausing the first transaction or aborting the first transaction.

20 Claims, 11 Drawing Sheets

(51) Int. Cl.
G06F 9/46 (2006.01)
G06F 15/80 (2006.01)

(56) References Cited

U.S. PATENT DOCUMENTS

| | | | |
|---|---|---|---|
| 2011/0078692 A1* | 3/2011 | Nickolls | G06F 9/3004 718/103 |
| 2011/0246725 A1* | 10/2011 | Moir | G06F 11/141 711/147 |
| 2016/0004643 A1* | 1/2016 | Gschwind | G06F 12/084 711/138 |
| 2016/0071312 A1* | 3/2016 | Laine | G06F 16/9027 345/419 |

OTHER PUBLICATIONS

"Chapter 8, Intel SHA Extensions," Intel Architecture Instruction Set Extensions Programming Reference, 2012, pp. 1147-1158.
Bobba et al., "Performance Pathologies in Hardware Transactional Memory," Proceedings of the 34th International Symposium on Computer Architecture, Jun. 9, 2007, pp. 81-91.
Fung et al., "Hardware Transactional Memory for GPU Architectures," Proceedings of the 44th International Symposium on Microarchitecture, Dec. 3, 2011, pp. 296-307.
Fung et al., "Energy Efficient GPU Transactional Memory via Space-Time Optimizations," Proceedings of the 46th International Symposium on Microarchitecture, Dec. 7, 2013, pp. 408-420.
Herlihy et al., "Transactional Memory: Architectural Support for Lock-Free Data Structures," Proceedings of the 20th International Symposium on Computer Architecture, 1993, pp. 289-300.
Herlihy et al., "Software Transactional Memory for Dynamic-Sized Data Structures," Proceedings of the 22nd Symposium on Principles of Distributed Computing, Jul. 13, 2003, pp. 92-101.
Herlihy et al., "A Flexible Framework for Implementing Software Transactional Memory," Proceedings of the 21st ACM SIGPLAN Conference on Object-Oriented Programming, Systems, Languages, and Applications, Oct. 22, 2006, pp. 253-261.
Holey et al., "Lightweight Software Transactions on GPUs," Proceedings of the 43rd International Conference on Parallel Processing, 2014, pp. 461-470.
Keckler et al., "GPUs and the Future of Parallel Computing," IEEE Micro, vol. 31, No. 5, Sep. 2011, pp. 7-17.
Kim et al., "Lock-Free Red-Black Trees Using CAS," Oct. 20, 2011, pp. 1-35.
Leng et al., "GPUWattch: Enabling Energy Optimizations in GPGPUs," Proceedings of the 40th International Symposium on Computer Architecture, 2013, pp. 487-498.
Marathe et al., "Lowering the Overhead of Nonblocking Software Transactional Memory," Technical Report #893, Department of Computer Science, University of Rochester, Mar. 2006, pp. 1-26.
Misra et al., "Performance Evaluation of Concurrent Lock-free Data Structures on GPUs," Proceedings of the 18th International Conference on Parallel and Distributed Systems, 2012, pp. 53-60.
Shriraman et al., "Flexible Decoupled Transactional Memory Support," Proceedings of the 34th International Symposium on Computer Architecture, 2007, pp. 1-12.
Spear et al., "RingSTM: Scalable Transactions with a Single Atomic Instruction," Proceedings of the 20th International Symposium on Parallel Algorithms and Architectures, Jun. 14, 2008, pp. 1-10.
Stipic et al., "TagTM—Accelerating STMs with Hardware Tags for Fast Meta-Data Access," Proceedings of Design, Automation Test in Europe Conference Exhibition, 2012, pp. 39-44.
Volkov, "Better Performance at Lower Occupancy," GPU Technology Conference, Sep. 22, 2010, pp. 1-75.
Waliullah et al., "Classification and Elimination of Conflicts in Hardware Transactional Memory Systems," Proceedings of the 23rd International Symposium on Computer Architecture and High Performance Computing, 2011, pp. 96-103.
Wang et al., "Lowering the Overhead of Hybrid Transactional Memory with Transact Cache," Proceedings of the 9th International Conference for Young Computer Scientists, 2008, pp. 1314-1319.
Xiang et al., "Conflict Reduction in Hardware Transactions Using Advisory Locks," Proceedings of the 27th International Symposium on Parallelism in Algorithms and Architectures, Jun. 13, 2015, pp. 1-10.
Xu et al., "Software Transactional Memory for GPU Architectures," Proceedings of the International Symposium on Code Generation and Optimization, Feb. 15, 2014, pp. 1-10.
"About CUDA," NVIDIA Developer, retrieved from https://developer.nvidia.com/about-cuda on Mar. 13, 2018, pp. 1-2.
"The Open Standard for Parallel Programming of Heterogeneous Systems," The Khronos Group Inc, retrieved from https://khronos.org/opencl/ on Mar. 13, 2018, pp. 1-10.
Fung, "Wilson Fung's Homepage," retrieved from http://www.ece.ubc.ca/~wwlfung/ on Mar. 16, 2018, 3 Pages.

* cited by examiner

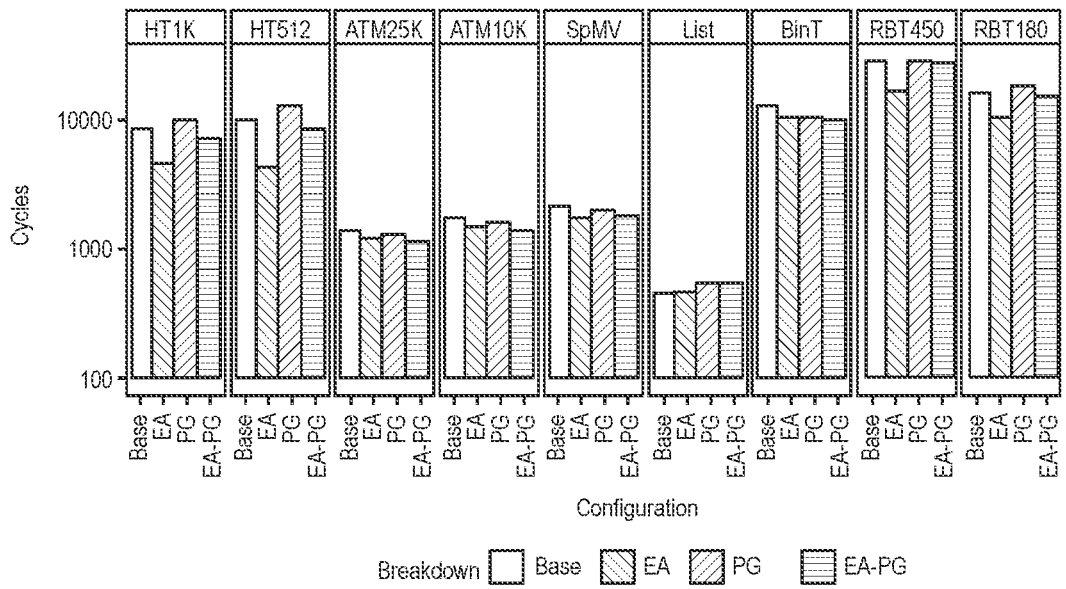

FIG. 12

```
Hashtable insertion kernel:
   __tbegin();
   int hash = key, pool_slot = tid+1
   BaseEntry *base = &g_hashtable->nValues[hash];
   tTableEntry *ent = &g_entrypool[pool_slot];
   ent->nKey = key;
   ent->nValue = value;
   ent->nNext = Base->mIndex;
   g_hashtable-> mValues[hash].nIndex = pool_slot;
   __tcommit();

Binary tree insertion kernel:
   __tbegin();
   while (true) {
      if (val< curr->val) {
         if (curr->left == NULL)
            curr->left = my; break;
         else curr = curr->left;
      } else {
         if (curr->right == NULL)
            curr->right = my; break;
         else curr = curr->right;
   } }
   __tcommit();
```

FIG. 13

ENHANCED PERFORMANCE FOR GRAPHICAL PROCESSING UNIT TRANSACTIONAL MEMORY

CROSS-REFERENCE TO RELATED APPLICATIONS

This application claims the benefit of and priority to U.S. Provisional Patent Application Ser. No. 62/470,627 filed on Mar. 13, 2017 and entitled "Enhanced Performance with Graphical Processing Unit Transactional Memory," which application is expressly incorporated herein by reference in its entirety.

BACKGROUND

Background and Relevant Art

Transactional memory (TM) is a technology that allows a programmer to mark code regions as "transactions" that satisfy serializability and atomicity. TM may be viewed as a generalized version of the atomic compare-and-swap instruction, which may operate on an arbitrary set of data instead of just one machine word.

The lifetime of a transaction may include one or more of four states:

1) executing, where it performs speculative read/write operations that constitute a transaction, 2) committing, where it is being checked against other committing transactions to see if data hazards (e.g., one or more conflicts) exist, 3) aborted, where a transaction fails conflict detection and is aborted, with its speculative execution scrapped and state rolled back to state that existed before the transaction began executing, and 4) committed, where a transaction passes conflict detection and its speculative results made durable and written to the memory.

TM systems may fall into distinct subregions of a design space. Design choice may be made based on when conflict detection is performed. An eager TM system performs conflict detection during execution while a lazy one does it in the commit stage, just prior to committing data. Another choice may be made on where to store versioning meta-data used for committing the transaction or rolling the transaction back to previous state. The meta-data may reside on the memory side in the form of ownership records, which are mapped to parts of the memory, such as locks associated with machine words or objects. The meta-data may alternatively or additionally reside on the thread side in the form of read/write logs, a buffer that keeps the speculative read/write values in a transaction.

Both hardware-based and software-based TM systems have been proposed for Graphics Processing Unit (GPU) systems. Both have to take into account the characteristics of the GPU in order to be efficient. Discussed herein are improvements to a hardware-based TM system, such as Warp TM (which is built on Kilo TM).

BRIEF SUMMARY

A computer system implementing transactional memory is illustrated. The computing system includes a plurality of Single Instruction Multiple Thread (SIMT) cores and a conflicting address table (CAT) for each core. The CAT stores word addresses for reads and writes correlated with flags indicating whether a corresponding word is written or read by a committing transaction. The CATs for the different SIMT cores are coupled together by an interconnect. A commit unit (CU) is coupled to the SIMT cores and is configured to validate transactions. The cores access its CAT to access a first address of data affected by a first transaction to be committed at the CU. The first address is compared to a second address affected by a second transaction. When the first address matches the second address, the core delays or prevents committing the first transaction at the CU by pausing the first transaction or aborting the first transaction to be committed by the core.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 12 illustrates, the average transaction length in cycles.

FIG. 13 illustrates the transactional code regions in hashtables and binary trees.

DETAILED DESCRIPTION

Figure 1:
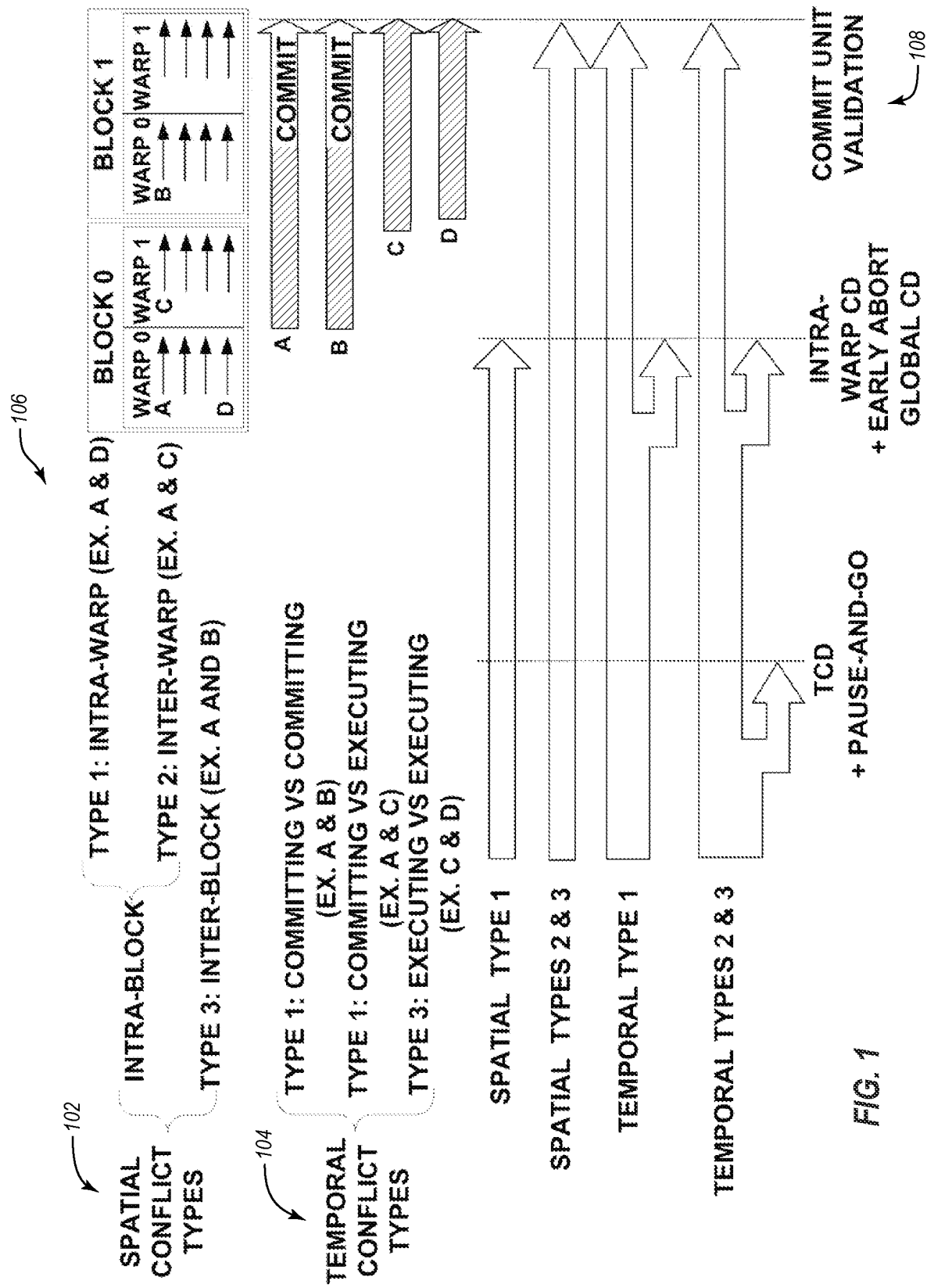
FIG. 1 illustrates, by way of example, a diagram of spatial and temporal types of conflict in a GPU TM and resolution flow of conflicts (end of arrow indicates resolution), in accord with one or more embodiments.

One or more embodiments of the disclosure regard one or more hardware, software, firmware, and/or logical improvements to a GPU TM. The modification(s) may provide increased throughput and/or a decreased power consumption in the GPU TM.

Introduction

Graphical Processing Units (GPUs) are generally designed for throughput-oriented computing using lightweight parallel threads. The GPUs may be constructed with compute units that may house large numbers of resident threads and a pipelined memory subsystem that may handle a large number of parallel memory accesses. The GPU is becoming more versatile with innovations to the GPU feature set enriching at least since compute acceleration programming models such as CUDA® from NVidia Corporation of Santa Clara, Calif., United States of America, and OpenCL from the Khronos Group of Beaverton, Oreg., United States of America, were introduced. Features like atomic operations and support for recursion have helped enable the construction of programs involving more complicated inter-thread cooperation. Also, a collection of lock-free data structures and programming libraries keeps expanding.

Correct and efficient implementation of synchronization methods in parallel programs that may scale up well is not a trivial task. While accessing a few hash tables may require only a single fine-grained word-based lock, writing a concurrent red-black tree is much more difficult. As such, TM has gained attention as a way to confront one or more challenges in the development of parallel programs. This may be because TM allows all read/write operations in a transaction to complete atomically as a whole, relieving the programmer of having to tackle fine-grained locks for performance and correctness. While most research efforts have focused on TM support on multi-core processors and hardware TM support has begun entering commodity CPUs, both software and hardware TM systems have been proposed for GPUs as well. One such TM is Kilo TM, followed by its successor Warp TM, both from a research group in British Columbia. Like ordinary GPU programs, GPU TM also faces the challenge of resource contention. As amount of concurrency on GPUs puts pressure on the memory subsystem, a programmer may spend some effort in optimizing the memory access pattern of the program in question, otherwise the program may not scale well. Increasing the number of concurrent threads may harm performance. The same phenomenon may also be observed in Kilo TM and Warp TM, where having more concurrent transactions may increase conflicts and resource contention, resulting in decreased performance. An analysis of a performance penalty resulting from conflict and contention with benchmarks running on Warp TM is provided below in this disclosure. One or more of at least two enhancements discussed herein may lead to performance improvement over Warp or other TM: (a) early-abort global conflict resolution: conflicting addresses are made accessible from the Single Instruction, Multiple Threads (SIMT) cores so that resolution of certain types of conflict may be done on the cores, reducing contention at the commit units (CUs) and/or and interconnection network, and (b) pause-and-go execution scheme: running transactions are stalled when a conflict is likely to happen, which protects the work the transaction has done so far from being wasted.

According to some experimental results (see "Experimental Results" below), a combination of the two approaches result in an overall speedup of up to 1.41× at an average power consumption of 0.8× as compared to Warp TM. Further, the enhancements used may be applied on top of various TM implementations because its correctness is provided by the underlying TM implementation.

At least the following are discussed herein: (1) An analysis of the performance overhead of conflicts in transactional memory on GPUs; (2) A study of GPU TM programs with short-running and long-running transactions; (3) A hardware modification for reducing conflict and contention; and (4) Two enhancements which may be used, individually or in combination, on GPU TM systems with various underlying GPU TM system implementations.

The Base Architecture

Kilo TM is a hardware-based GPU transactional memory system, which features value-based validation and lazy version management, thus allowing a programmer to write weakly-isolated transactions in GPU kernel code. Kilo TM is based on an algorithm similar to Ring software TM (RingSTM). In the base algorithm, a lifetime of a transaction may be divided into execution and commit. During execution, the transactional loads and stores performed are buffered in read-logs and/or write-logs. During commit, the logs are transferred to the CUs in the memory partitions for conflict detection and resolution. Conflicts between committing transactions are detected using an algorithm similar to RingSTM, with transactions claiming entries in a ring buffer and committing in a global order. To speed up committing, the validation operation is performed in two stages. The first stage involves probabilistically detecting overlap between the signatures of read-sets and write-sets encoded with bloom filters, which is also called hazard detection. The second stage is value-based validation, is needed only when a hazard exists, and is responsible for resolving false hazards.

The Kilo TM design introduces new hardware units and new hardware features to enable the operation of TM. The execution stage of transactions takes place in the SIMT cores. The load/store units are responsible for maintaining the read-logs and/or write-logs for transactions that are being executed. The SIMT stack is extended to handle transactional code blocks. The commit stage takes place in the CUs, which implements the ring buffers, bloom filter-based signatures, and valid-based validation. The CUs are located in the memory partitions. The entire address space is divided into disjoint sets, each of which is managed by one CU. As such, the implementation is a distributed algorithm which involves multiple CUs, and a protocol that aggregates and broadcasts validation results between the CUs and SIMT cores. At the beginning of a commit, the transactional log walkers transfer the logs to the CUs. After validation results are computed, they are sent back to the originating SIMT cores.

Derived from Kilo TM, Warp TM introduces the concept of warp-level transaction management. In warp-level transaction management, threads in the GPU are executed in lock-step, referred to as "warps". This is reflected in various aspects of the design of the GPU hardware. As a result it may be advantageous to handle the threads in a warp as a single entity.

Warp TM implements at least two optimizations. First, scalar protocol messages in Kilo TM are superseded by coalesced protocol messages in Warp TM. Second, conflicts within a warp are resolved prior to the transfer of read/write sets for global commit and validation. This may reduce contention and delay at the CUs, improve performance, and reduce energy consumption.

Conflict and Contention Reduction

FIG. 1 illustrates, by way of example, a diagram of spatial conflict types 102 and temporal conflict types 104 in a GPU TM and resolution flow 106 of conflicts (where the tip of an arrow indicates resolution), in accord with one or more embodiments. Conflict types are discussed in a way that is relevant to the GPU architecture in question. Because of the GPU architecture, certain types of conflict may be resolved at the SIMT cores. Other types of conflicts have to travel through the CUs, as illustrated in FIG. 1 at 108. So, more conflicts resolved on the core side means fewer transactions need to reach the CU for conflict resolution. Here the types of conflicts and resolutions are illustrated.

Spatial and Temporal Types of Conflict

Spatial: A conflict between two simultaneously running transactions in the GPU transactional memory may span across different levels of thread hierarchies, as illustrated in FIG. 1. Depending on the location of the transactions in a conflict pair there exist three non-overlapping spatial types: Type 1 (intra-warp), Type 2 (inter-warp, but in the same block), and Type 3 (inter-block).

Since the shared memory is the "most recent common ancestor" in the memory hierarchy accessible to threads in the same block, Type 1 conflicts may be resolved within the SIMT core using the shared memory, as is described as "intra-warp conflict resolution" in Warp TM. Type 2 conflicts, however, are not handled by warp-level conflict detection due to the overhead of increased complexity and the rarity of Type 2 conflicts. Type 3 conflicts involve global read/write sets so they cannot be resolved in the SIMT core.

The detection of both Type 2 and 3 conflicts needs is done in one level higher in the memory hierarchy which is the off-chip DRAM partitions, the "most recent common ancestor" in the memory hierarchy accessible to threads in different blocks.

One transaction may be involved in more than one type of conflict with other transactions, but no transactions may commit if one conflicts with any committing transaction at all. Performance improvement may come from resolving Types 2 and 3 conflicts at the SIMT core, such as in addition to resolving Type 1 conflicts.

Temporal: For transactions not executing in lock-step, they must overlap both temporally and spatially to conflict with each other. Recall that the two steps in the lifetime of a transaction are execution and commit. Depending on the operation, the transactions in a pair are in, there exist three non-overlapping temporal types: Type 1 (committing and committing), Type 2 (committing and executing) and Type 3 (executing and executing). All 3 types of conflicts may be resolved at the CU (e.g., with one exception that read-only transactions may self-abort when the read-only transaction fails temporal conflict detection). This may be, at least in part, because only the CU has the information needed for conflict resolution.

To summarize, the more conflicts resolved before a running transaction reaches the CU, the less contention there will be in the entire system. As is previously discussed, two approaches are provided that resolve conflicts of Spatial Type 3 (inter-block) and of Temporal Type 2. The approaches are enabled by improving existing hardware that makes conflict data available in the SIMT cores, see FIG. 2, which illustrates an SIMT core 202 having a global early-abort conflict resolution logic unit 204 and a pause-and-go logic unit 206. The two approaches (as previously discussed): (a) Early-Abort global conflict resolution (sometimes referred as "Early-Abort") resolves conflicts between transactions about to commit and the ones already committing. Similar to intra-warp conflict detection, Early-Abort reduces the number of transaction reaching the CU 208 and saves validation cost; and (b) Pause-and-Go execution scheme (sometimes referred to as "Pause-and-Go") resolves conflicts between executing transactions and committing transactions by temporarily stalling transactions that are about to execute load/store instructions that may result in a conflict. Pause-and-Go reduces the incidence of conflicts. The result is fewer conflicts, less resource pressure on the CU, and/or better overall performance. Both approaches are enabled by the hardware modification described in the section titled "HARDWARE MODIFICATIONS TO WARP TM".

Concerns Over Correctness

It may be important for a TM system to guarantee the correct execution of a transaction. Correctness may be guaranteed by an operation in the transaction execution flow, value-based validation. Early-Abort may only abort transactions selectively and may never commit the write sets to the memory; Pause-and-Go does not abort any transaction so it does not cause inconsistency. More specifically, what may happen when a false positive or a false negative occurs is one or more of the following: (a) if a non-conflicting transaction is aborted, its work up to the commit point is wasted and it will restart from the beginning of the transaction; (b) if a conflicting transaction is not identified in Pause-and-Go or Early-Abort, it will eventually be aborted at the Commit Unit. This is the same expected behavior as in Warp TM.

Another potential problem that TM systems may encounter is livelocks. A livelock is caused by transactions repeatedly aborting another. Similar symptoms are sometimes referred to as "Friendly Fire" and "Dueling Upgrades". Pause-and-Go and Early-Abort generally do not introduce such "pathologies". This may be at least because only committing transactions are allowed to abort executing transactions but not the other way around, resulting in an implicit conflict management policy that gives priority to committing transactions. Therefore, a pair of transactions may not repeatedly abort each other.

Hardware Modifications to Warp TM

Figure 3:
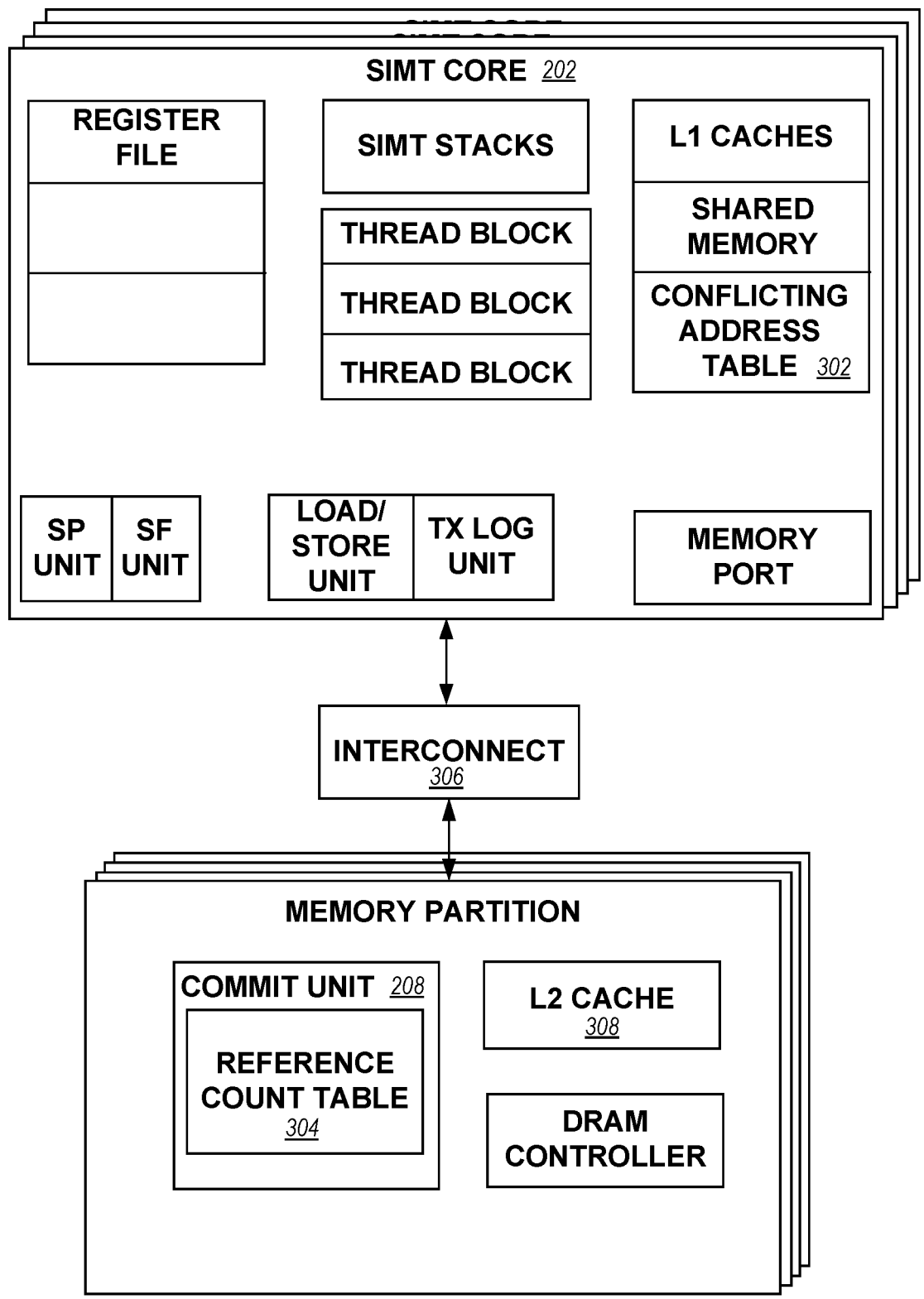
FIG. 3 illustrates, by way of example, a block diagram of an embodiment of a GPU TM, in accord with one or more embodiments.

Additional details regarding the modified hardware is depicted in FIG. 3. The hardware modifications illustrated in FIGS. 3 and 4 include two address-indexed lookup tables. The per-SIMT-core Conflict Address Table (CAT) 302 maps addresses to flags, implemented as two bits, in the current example, indicating whether a word is written or read by committing transactions (or both if both flags are set). The per-CU Reference Count Table (RCT) 304 maps addresses to the number of readers and writers. The CU 208 maintains the RCT 304 as it processes committing transactions. The CAT 302 on the various cores may be updated through an interconnection network 306. When a transaction is executing, the SIMT core 202 tries to resolve conflicts early utilizing the CAT 302.

Maintaining the RCT and the CAT

When a transaction is committing, it will potentially be involved in conflict with all other committing and running transactions over the addresses in its read and write sets. To detect conflict between a committing transaction and a running transaction, the read/write logs of the committing transaction may be made visible to the SIMT cores. The two tables may operate in conjunction to achieve this goal.

The RCT 304 in a CU 208 keeps the number of readers and writers. It is updated as committing transactions are processed. After log transfer is completed, read/write addresses reach the CUs. The read addresses are appended to the ring buffer as well as the validation queue and are prepared for value-based validation. The write addresses are inserted into a Last Writer History Table (LWHT), which is also an address-indexed lookup table. At these two points, the reader/writer count in the RCT 304 of an address is incremented for each address appearing in the read/write set.

As the CU 208 receives a validation reply from an L2 cache 308, it may check the value of each of the words in the read set. If all values in the read set match the values in the memory, the transaction passes value-based validation. If any address does not match, the transaction fails validation. Whatever the outcome of the transaction is, the addresses will not be used by the transaction anymore. So, when the outcome is known, the CU 208 traverses the read/write logs and decrements the reference counts for those addresses in the RCT 304.

Figure 4:
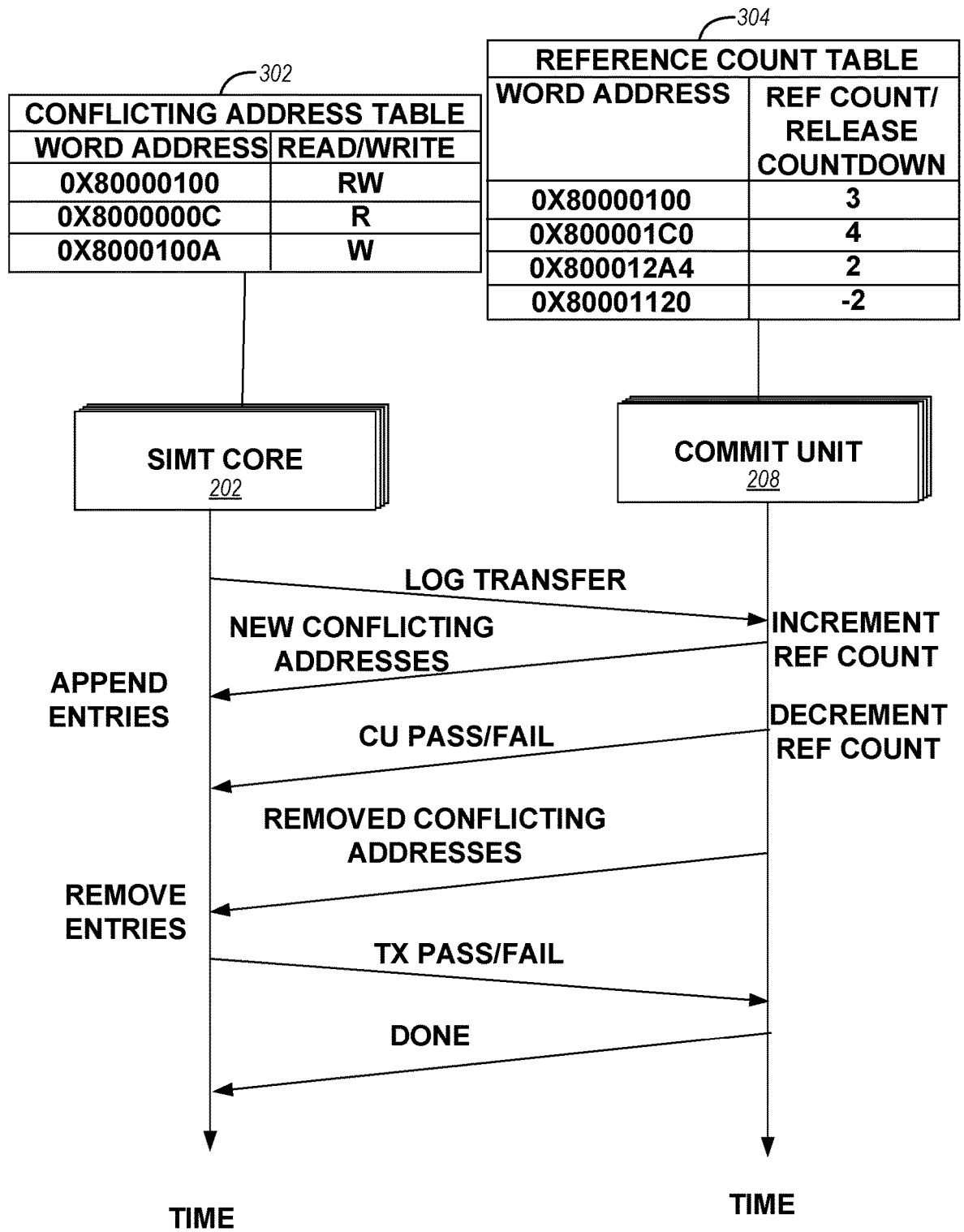
FIG. 4 illustrates, by way of example, a communication diagram of communications between a conflicting address table of a SIMT core and a reference count table of a commit unit.

The core-side CATs reflect which addresses are being referenced in the CU 208. Each time addresses are inserted into or removed from the per-CU RCT 304, a message may be sent from the CU 208 to notify all the SIMT cores of the change in the address set. The message may include a series of entries, each of which may include the word addresses, a read/write bit, and/or an add/remove bit. Since the words may be aligned to a multiple of 4 bytes, the two least significant bits in the addresses may always be zero. Thus, in some embodiments, each entry may be made exactly 4 bytes long. After (e.g., in response to) the SIMT cores receive the packets, the SIMT cores update the CAT 302 accordingly. FIG. 4 provides a visual description of the two tables and a flow diagram showing how they are updated.

Table Size Limit

When the RCT 304 is full, new entries may be ignored. In such a case, the CAT 302 may not be updated either. Opportunity for reducing contention may be missed when the tables are full, but the correctness of transactions will not be affected since the correctness is guaranteed by the TM implementation in the value-based validation stage.

Early-Abort Utilizing the CAT 302

Early-Abort tries to detect Spatial Type 3 (inter-block conflict) conflicts at the intra-warp conflict resolution stage and abort the conflicting transactions. By avoiding sending the read/write sets of the conflicting transactions to the CU 208, Early-Abort reduces the resource contention in the CU 208. This operation may include matching the read/write sets of the threads in a warp with the addresses in the CAT 302. The match may be implemented by performing a table look-up during the log scanning process. Assuming a 4-port L1 cache, the lookup takes up to 8 cycles for a warp with 32 active threads. The match may overlap with the mark-and-check Intra-Warp Conflict Resolution operation. When a transaction reads/writes an address in the CAT 302, it is considered likely to be in conflict with another committing transaction and is aborted (e.g., except for read-read transactions, that is, the transactions are exclusively read transactions). After this operation, the transactions in a warp are free of Spatial Type 1 (intra-warp) conflicts with reduced Spatial Type 3 (inter-block) conflicts.

Pause-and-go Execution

Certain transactional applications contain very long transactions or large read/write sets and may encounter conflict over only a small fraction of the read/write sets, resulting in some of the work being wasted. Pause-and-Go execution takes a more "gentle" approach to such conflicting transactions, trying to avoid aborting the entire transaction while resolving the conflicts.

At each load/store instruction, the read/write addresses for a warp are checked against the CAT 302, which may take up to 8 cycles with a 4-port L1 cache. A thread that is likely to conflict is temporarily "paused". The remaining threads will continue executing and attempt to commit. After the attempt to commit is completed, the control flow will return to the paused threads.

Figure 5:
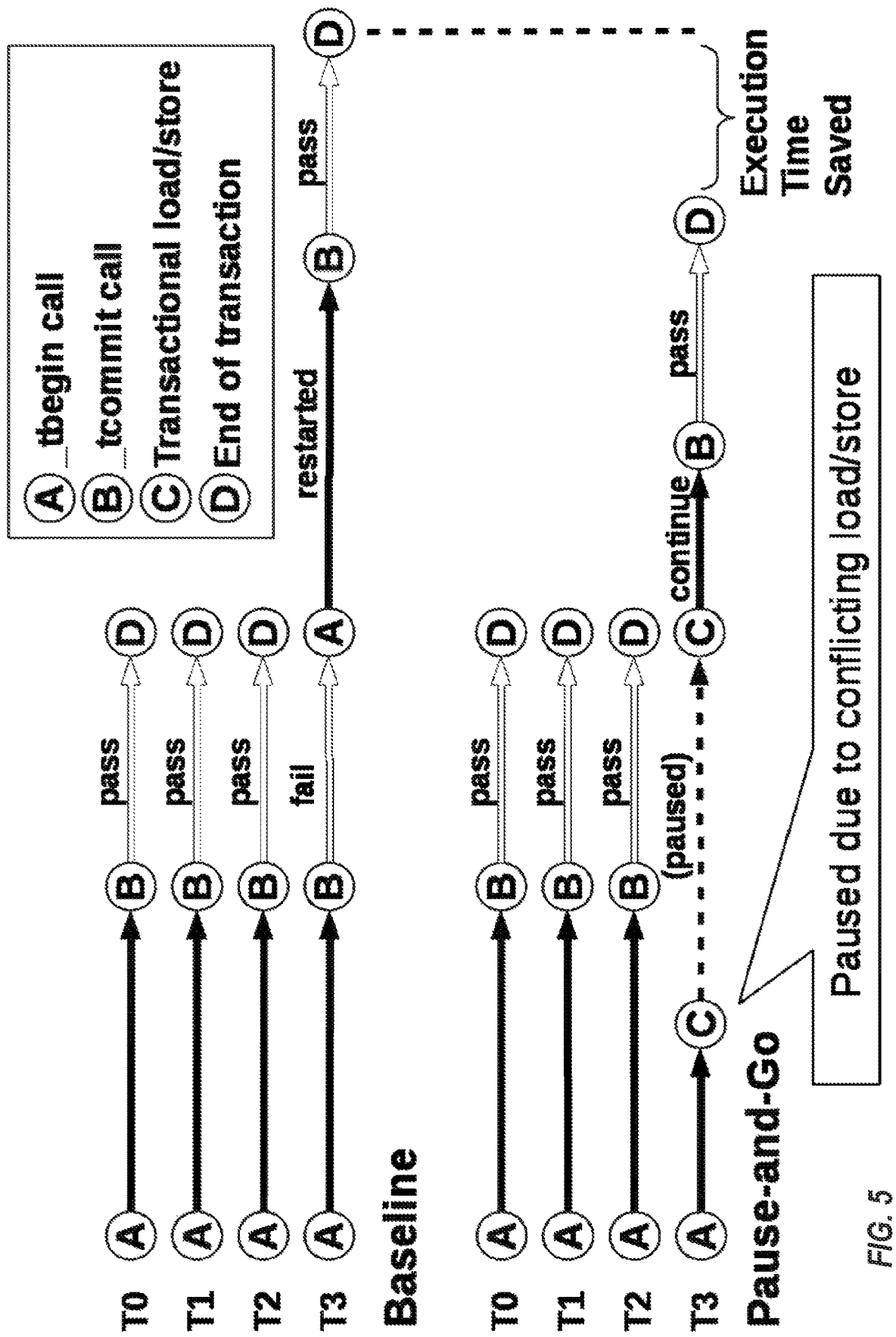
FIG. 5 illustrates, by way of example, a flow diagram of Pause-and-Go, in accord with one or more embodiments.

By pausing a potentially conflicting transaction before the commit stage, the "paused" thread may simply avoid the conflict without having to restart execution. Restarting a transaction is costly especially for long transactions. FIG. 5 illustrates one case where Pause-and-Go avoids wasting work done by an otherwise aborted transaction. In particular, FIG. 5 compares execution with and without Pause-and-Go to show execution time that can be saved by using Pause-and-Go.

In order to correctly recover the transactional logs upon the resume of paused transactions, the Log Index (L column, see FIG. 6) may be added to the SIMT core stack. The Pause-and-Go execution scheme revolves around the SIMT stack and the transactional logs.

Figure 6:
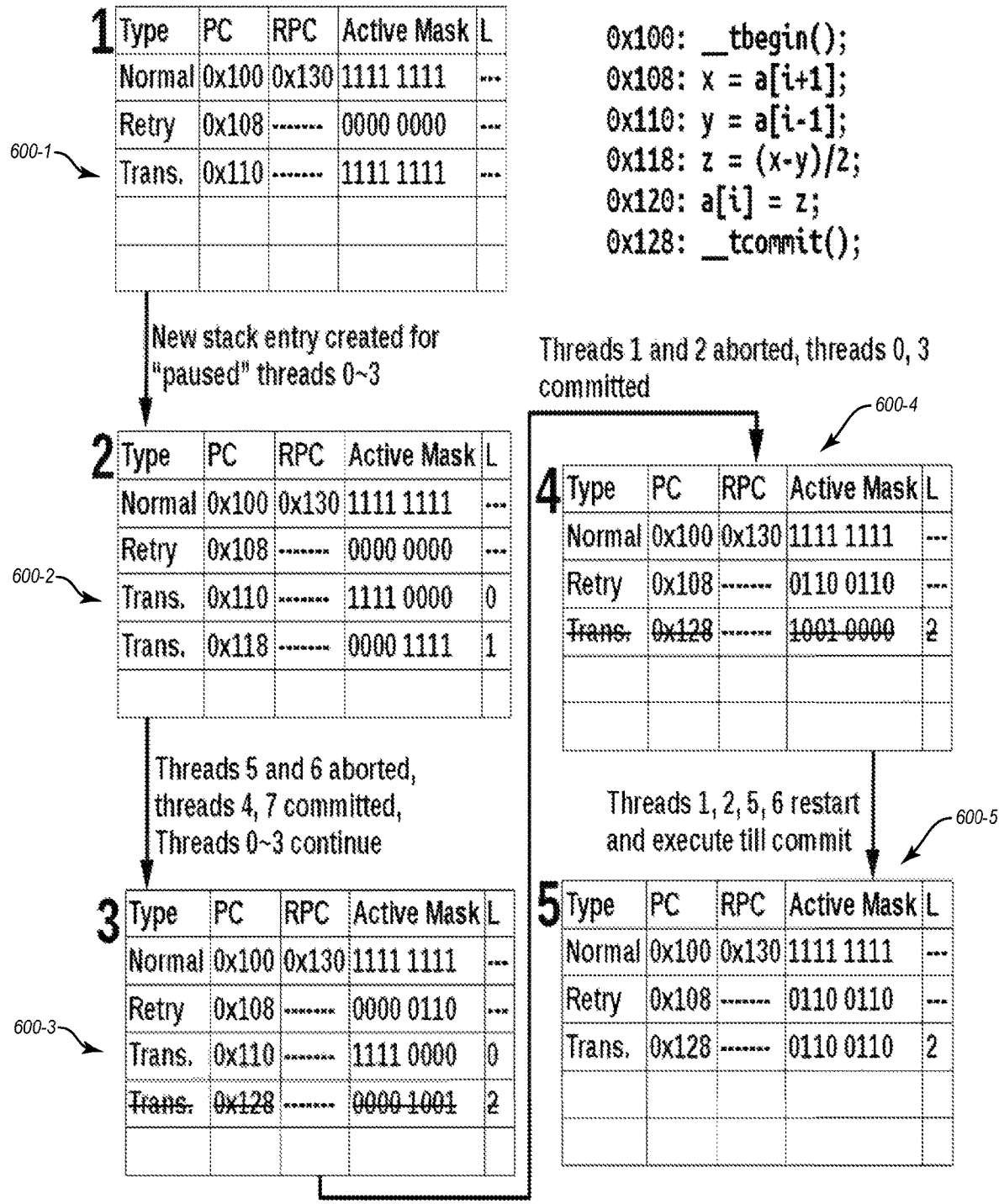
FIG. 6 illustrates, by way of example, a flow diagram of SIMT stack handling for Pause-and-Go and Early Abort, in accord with one or more embodiments.

SIMT Stack: Pause-and-Go execution introduces new SIMT stack states. FIG. 6 illustrates how the states may be maintained in one example. At "1" (stack state 600-1), transactions start, with one Retry entry and one Trans entry pushed onto the SIMT stack. The threads execute the instruction at 0x110, which performs a transactional load. The addresses loaded by threads 0-3 exist in the CAT 302, so they are "paused" and will not continue executing with threads 4-7 for this commit attempt. This results in the SIMT stack configuration in "2" (stack state 600-2), where two Trans entries exist on the top of the stack. The top of stack which represents threads 4-7 attempt to commit, but only threads 4 and 7 passed validation. Bits 5 and 6 are set on the Retry entry, as shown at "3" (stack state 600-3). The top of stack Trans entry is popped from the stack, and the Trans entry representing the previously paused threads 0-3 becomes the top of stack, as shown at "4" (stack state 600-4). Threads 0-3 execute and attempt to commit, but only threads 0 and 3 passed validation. Bits 1 and 2 are set on the Retry entry and results in the stack configuration in "4" (stack state 600-4). After the Trans entry is popped from the stack, the Retry entry becomes the top. After that, execution flow may be the same as what is expected in the original Kilo TM and Warp TM, where the Retry entry is copied to create a new Trans entry, as shown at "5" (stack state 600-5). Branch divergence inside paused threads may be handled in the same way as in Kilo TM and Warp TM.

Figure 7:
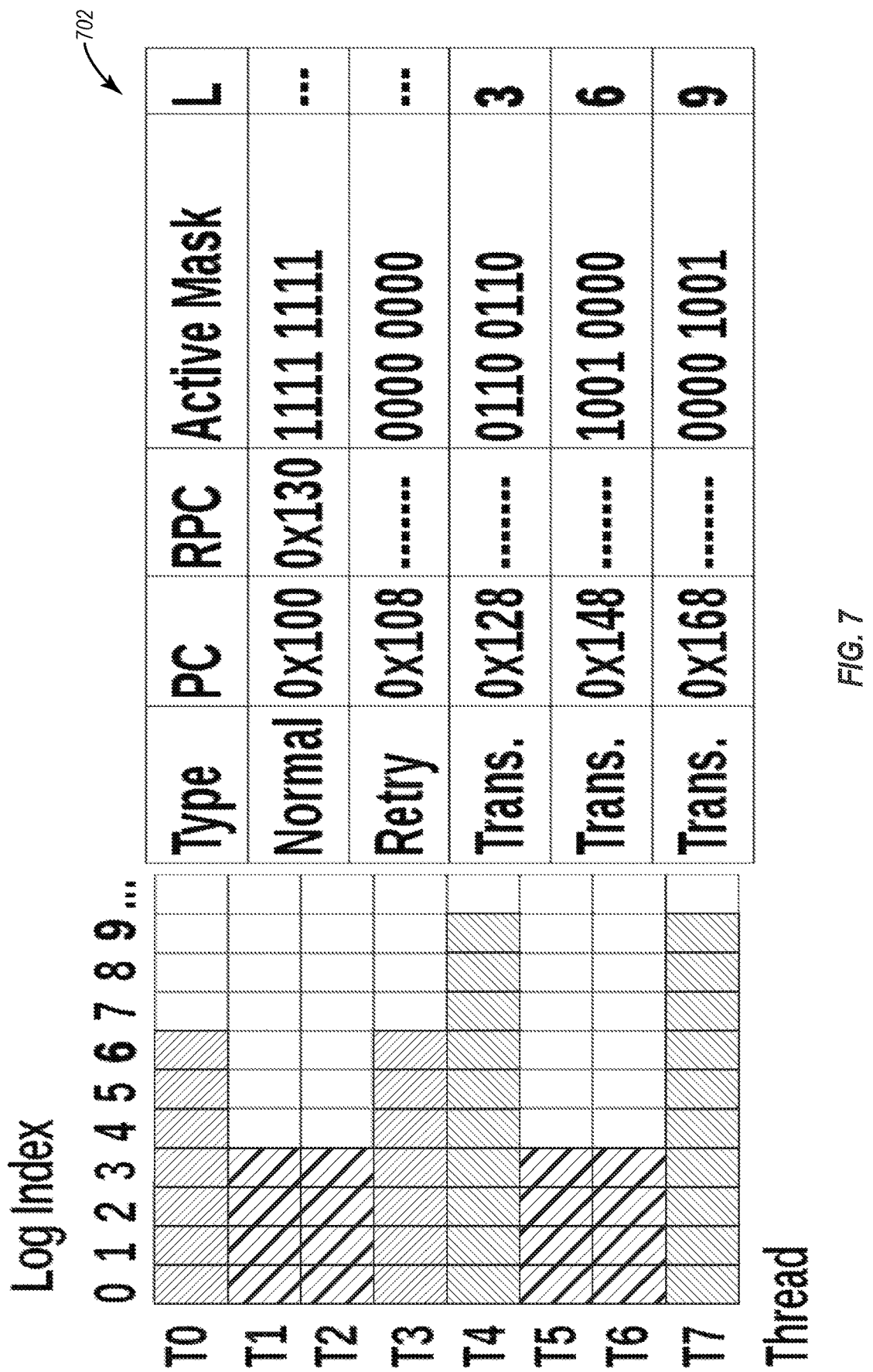
FIG. 7 illustrates, by way of example, a diagram of transactional log and SIMT stack handling, in accord with one or more embodiments.

Transactional logs: As a warp is being executed, the log index in its corresponding SIMT stack entry may be kept in sync with the log pointer of its transactional log walker, as illustrated in FIG. 7. To back up the transactional logs for the paused transactions, the log pointer is stored in the log index field 702 for the newly created Trans SIMT stack entry. To resume the transactional logs, the log pointer may be reset to the value in the log index field 702 in the SIMT stack when the paused transactions resume.

A reason backup and restore may be done with just modifying the log pointer may be because a log entry represents all the transactions in a warp, including inactive ones, for which the entries contain zeroes. The logs may be interleaved into a linear buffer. As a result, the log entries of paused transactions may not get overwritten by other active transactions, and restoring the log state may only include changing the log pointer.

Integrating with Warp TM

Figure 2:
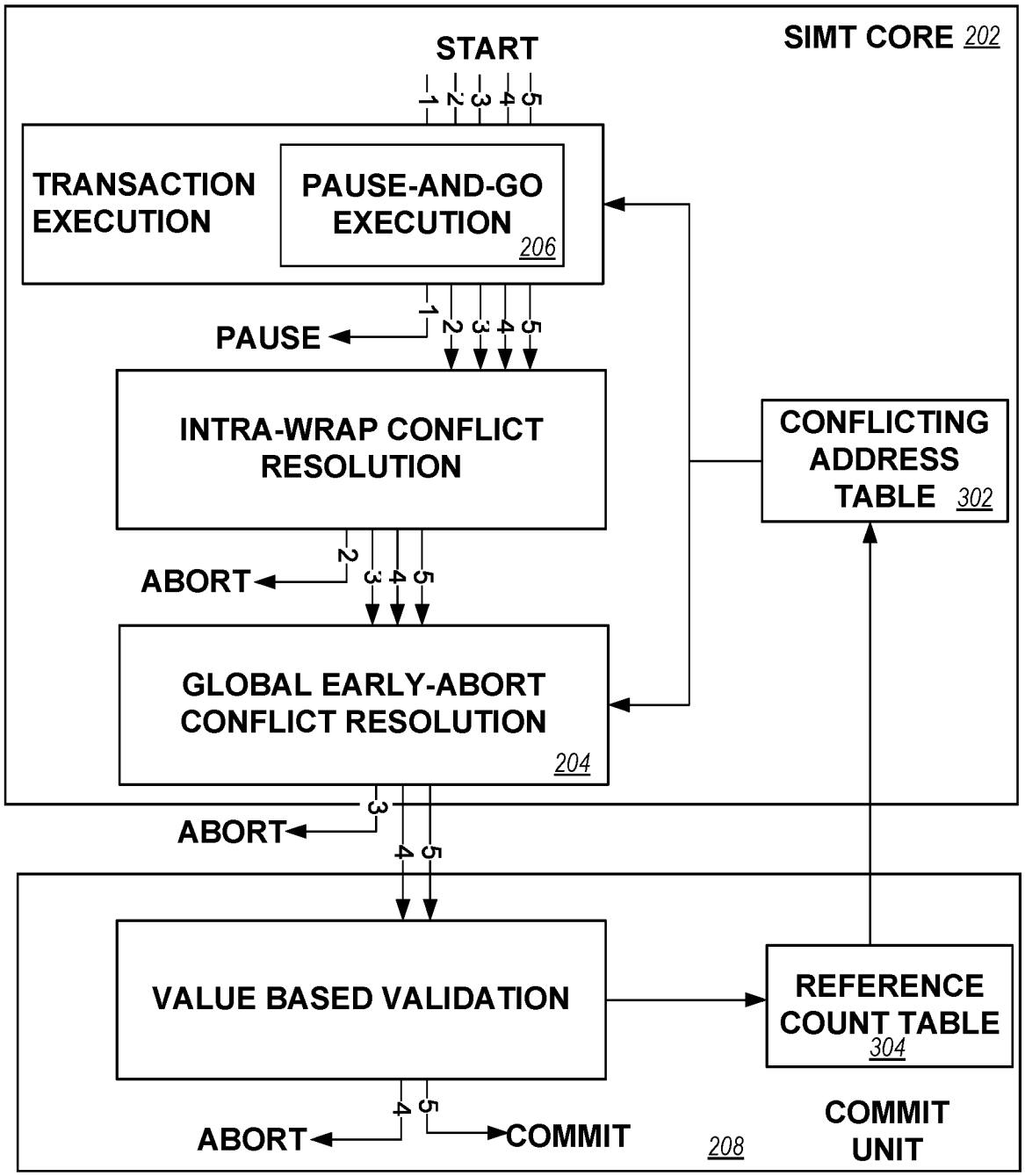
FIG. 2 illustrates, by way of example, a flowchart for handling a conflict and non-conflict data in a GPU TM, in accord with one or more embodiments.

As FIG. 2 shows, Early-Abort and Pause-and-Go may be added to the transactional execution flow. Due to the fact that the RCTs are only updated when a transaction starts committing and the existence of delay in passing message from the CUs to the SIMT cores, Early-Abort and/or Pause-and-Go may cause false positives in aborting or pausing transactions.

As is discussed in the section titled "CONCERNS OVER CORRECTNESS", the correctness of transactions may be guaranteed by the TM and therefore not affected. Together Pause-and-Go and Early Abort provide a hierarchical validation scheme similar to Warp TM and the GPU STM.

The two approaches proposed, Early-Abort and Pause-and-Go, may achieve performance improvement regardless of the number of concurrent transactions per SIMT core. The RCTs in the CUs may be constructed via modifications on the LWHT. The CATs in the SIMT cores may be constructed with the same hardware as the L1 cache and/or the shared memory.

Experiments

For comparison, a baseline GPU of an extra L1 cache with the size of a CAT (extra 12 KB) is provided in Table 1.

TABLE 1

Benchmark Properties

GPU

| | |
|---|---|
| SIMT Cores | |
| SIMD Width | 16 × 2 |
| Warps/Threads per Core | 48 warps × 32 = 1536 threads |
| Memory Partitions | 6 |
| Core/Interconnect/Memory Clock | 1400/1400/924 MHz |
| Warp Scheduler Count | 2 per Core |
| Warp Scheduler Policy | Greedy-then-oldest |
| L1 Data Cache per Core | 60 KB/48 KB, 128 line, 6-way (not caching global accesses) |
| Shared Memory per Core | 16 KB |
| L2 Cache for all Cores | 128 KB × 6 partitions = 786 KB |
| Interconnect Topology | 1 Crossbar per Direction |
| Interconnect Bandwidth | 32 B/cycle = 288 GB/s per direction |
| Interconnect Latency | 5 Cycles to Travers |
| DRAM Scheduler | Out-of-Order, FR-FCFS |
| DRAM Scheduler Queue Size | 16 |
| DRAM Return Queue Size | 116 |
| DRAM Timing | Hynix H5GQ1H24AFR |
| Min. L2 Latency | 330 Compute Cycles |
| WARP TM | |
| Commit Unit Clock | 700 MHz |
| Validation/Commit BW | 1 Word per Cycle per CU |
| Concurrency Control | 2 Warps per Core (960 Concurrent Transactions) |
| Intra-Warp CD Resources | 4 KB Shared Memory per Warp |
| Intra-Warp CD Mechanism | 2-Phase Parallel Conflict Resolution |
| TCD Last Written Time Table | 16 KB (2048 Entries in 4 Sub Arrays) |
| TCD Detection Granularity | 128 Byte |

TABLE 1-continued

Benchmark Properties

CONTENTION REDUCTION

| | |
|---|---|
| Conflict Address Table per Core | 12 KB (3072 Entries) |
| Reference Count Table per CU | 15 KB (3072 Entries) |

EXPERIMENTAL SETUP

| Name | Threads | Read/Write Set Size | Avg. TX Length (Cycles) |
|---|---|---|---|
| Hash Table 1K entries (HT1K) | 23040 | 2/4 | 8835 |
| Hash Table 512 entries (HT512) | 23040 | 2/4 | 10135 |
| ATM 25K accounts (ATM50K) | 23040 | 3/2 | 1423 |
| ATM 10K accounts (ATM25K) | 23040 | 3/2 | 1803 |
| Sparse Mat-Vec Mult (SpMV) | 13000 | 5/1 | 2221 |
| Linked List (List) | 23040 | 1/4 | 460 |
| Binary Tree (BinTree) | 1000 | 78/2 | 13320 |
| Red-Black Tree small (RBT180) | 180 | 33/17 | 16604 |
| Red-Black Tree large (RBT 450) | 450 | 33/17 | 29455 |

Discussed herein is a Warp TM hardware platform using General Purpose (GP) GPU Simulator (SIM). GP GPU SIM simulates a device similar to NVidia GTX 480 (Fermi). Table 1 summarizes some architectural parameters. The following benchmarks are used in an evaluation:

Hash Table is a benchmark used in Kilo TM, where each thread inserts into a hash table, each being a linked list. Used herein are table sizes 1024 and 512 to create higher contention workloads.

Bank Account (ATM) is a benchmark used in Kilo TM, where each thread performs bank transactions between two out of a fixed number of accounts. Used herein are 25K and 10K accounts.

SpMV is a program that multiplies a vector and a sparse matrix represented in the Yale format. Transactions are used to update the destination vector.

List is based on the ListRel benchmark from dynamic STM version w (DSTM2). The task of each thread is to insert a node into a linked list. Each thread first finds the insertion point in non-transactional code, then performs the insertion with a transaction.

BinTree is a generic binary search tree. The tree is programmed in a way similar to List, where each transaction first finds the insertion point in non-transactional mode and then performs the insertion with a transaction.

RBTree is a port of the red-black tree implementation in a Rochester STM (RSTM) test suite. Each thread performs an insertion into the red-black tree with a transaction. Table 1 summarizes the benchmarks. The benchmarks differ in transaction length, read/write set size, contention rate and working set size. This allows us to evaluate the early conflict resolution approaches in a wide range of situations.

GPUWattch was used to estimate the average dynamic power consumed by each benchmark with the two proposed approaches added to Warp TM. This includes the lookup and maintenance of the RCTs and the CATs, as well as the extra interconnection traffic required to update the CAT. The average power is then multiplied by the execution time to obtain the total energy needed to execute each benchmark.

Experimental Results

In this section, performance improvements resulting from the proposed enhancements, Early-Abort and Pause-and-Go, are analyzed and compared to the baseline.

Performance and Power Consumption

Figure 8:
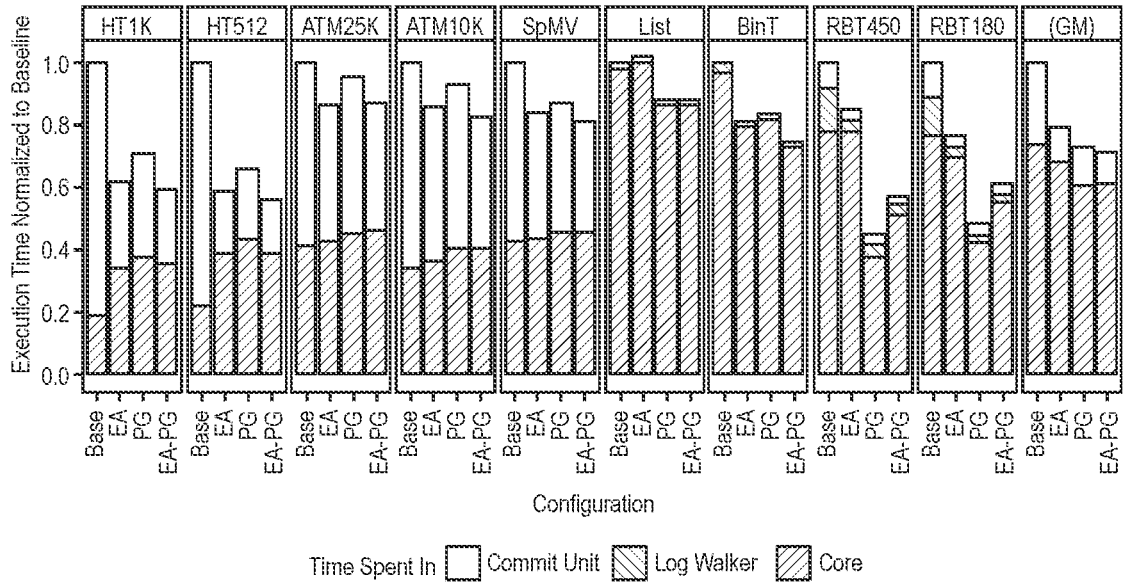
FIG. 8 illustrates overall running time and per-transaction breakdown comparisons.
Figure 9:
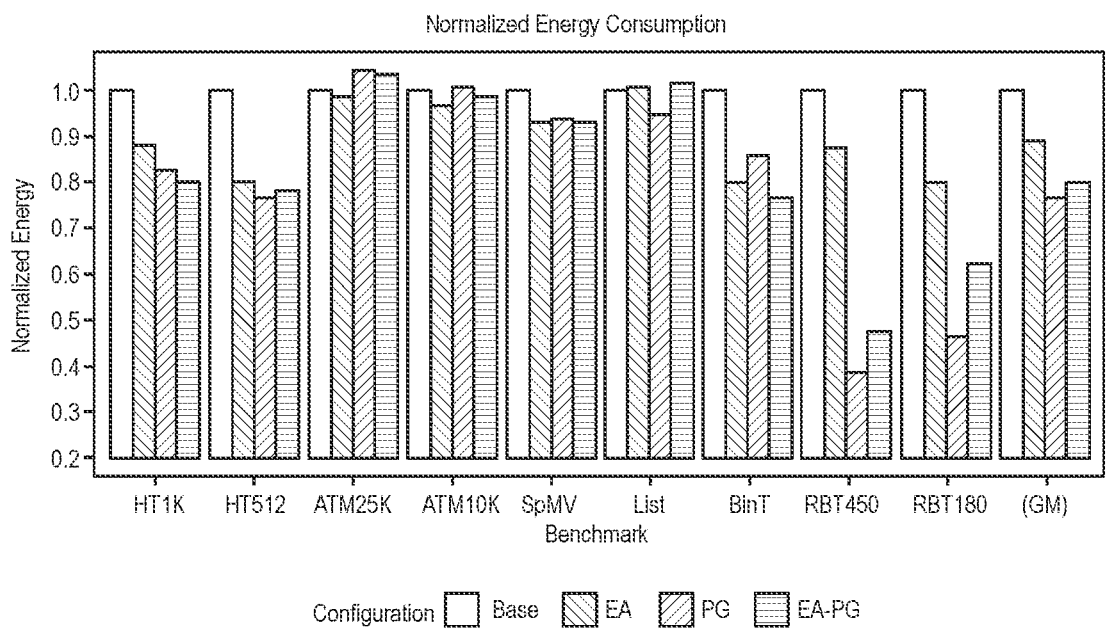
FIG. 9 illustrates normalized energy consumption for different transactions.

FIGS. 8 and 9 show the overall running time breakdown of the benchmarks and the overall energy consumption.

Overall, the proposed approaches yielded a speedup of 1.41× (an average of 0.71× running time) compared to baseline Warp TM. On average, enabling both approaches yielded higher performance improvement than using either approach alone. The average energy consumption also decreased, at least in part, due to the decrease in execution time. On average the energy consumption is 0.8× compared to the baseline Warp TM.

The benchmarks suggest that the Early-Abort yields greater performance improvement than Pause-and-Go for Hashtable (HT1K and HT512), Bank Account (ATM25K and ATM10K) and SpMV, while Pause-and-Go performs better on Binary Tree (BinT) and Red-Black Tree (RBT450 and RBT180).

The running time result shows that Hashtable (HT1K and HT512), Bank Account (ATM25K and ATM10K) and SpMV spend a significant amount of time in the CU and that Bank Account and SpMV perform better with Early-Abort. Since Early-Abort reduces the number of conflicting transactions entering the CU, transactions in these benchmarks may commit faster.

On the contrary, some of the benchmarks benefit more from Pause-and-Go. In these benchmarks, the running times are mainly spent in the SIMT core. The aforementioned results are caused by multiple reasons, such as including the average transaction length, types of conflict between the transactions, running time breakdown and/or the degree of branch divergence in each of the benchmarks.

FIG. 8 shows the overall running time and per-transaction breakdown. GM in the Figure stands for geometric mean of all benchmarks. The lower the bar in a particular graph, the faster the time to complete the transaction.

FIG. 9 illustrates normalized energy consumption for transactions. The lower the bar in each graph, the lower the energy consumption.

Performance Improvement from Reduced Commit Unit Contention

For Hashtable (HT1K and HT512), Bank Transfer (ATM25K and ATM10K) and SpMV, a correlation may exist between the reduced number of transactions aborted at the CU (see FIG. 10) and the improved overall performance (see FIG. 8).

The reason behind the correlation may be two-fold: (a) First, aborting conflict transactions at the SIMT core side prevents resource contention at the CU, which makes committing faster; (b) Second, due to the shortened delay, the SIMT core may complete committing the current warp and switch to other warps more quickly.

The correlation between the load on CU and overall performance is most obvious in Hashtable (HT1K and HT512): the ratio between aborts at the SIMT core and CU has shifted. With Early-Abort enabled, more than half of the transactional aborts occur in the SIMT cores. This means there were many conflict pairs that fall into the Type 2 (inter-warp) and 3 (inter-core) categories that were not resolved by intra-warp conflict resolution alone, but are resolved by Early-Abort. As a result, despite the higher number of cumulative aborts, the transactions are able to complete faster, at least because the CUs are less congested.

Figure 11:
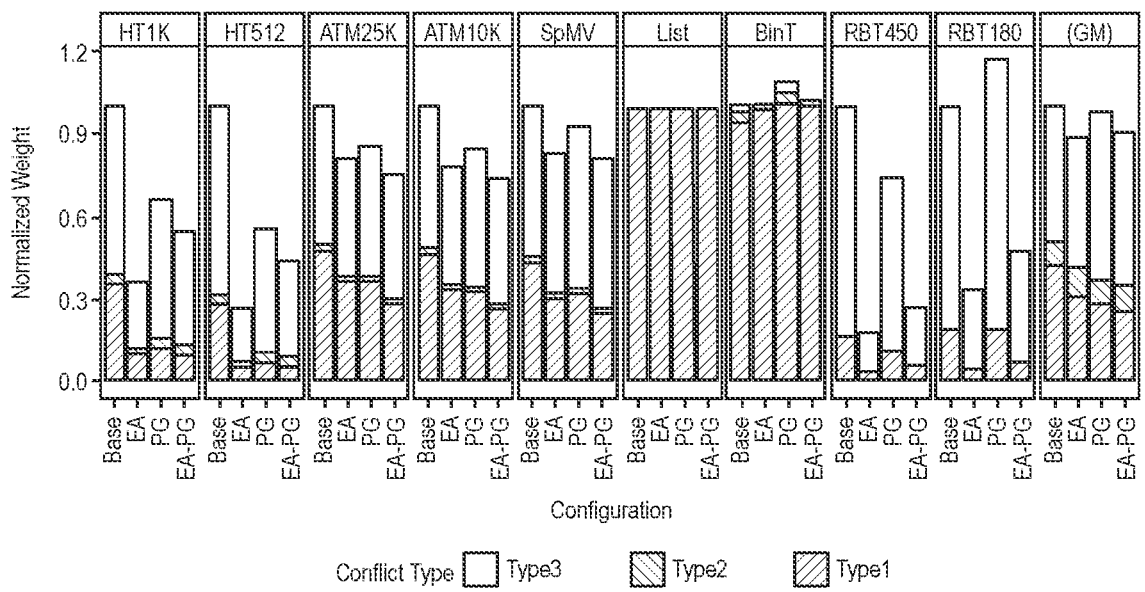
FIG. 11 illustrates the overall breakdown of types of conflicts between all running transactions, counted in pairs of transactions, by whether Read/Write addresses overlap.

FIG. 11 shows that in Hashtable (HT1K and HT512), Bank Account (ATM25K and ATM10K) and SpMV, more than half of the conflicts between transactions are of Type 3. Most of the conflicts may be detected by Early-Abort in the SIMT core, but would have to go through the CU in Warp TM with only intra-warp conflict resolution enabled. On the other hand, enabling Pause-and-Go execution scheme reduces the overall number of aborts and amount of conflicts most of the time. Thus, FIG. 11 shows an overall breakdown of types of conflicts between all running transactions, counted in pairs of transactions, by whether read/write addresses overlap.

Performance Improvement from Reduced Aborts

Figure 10:
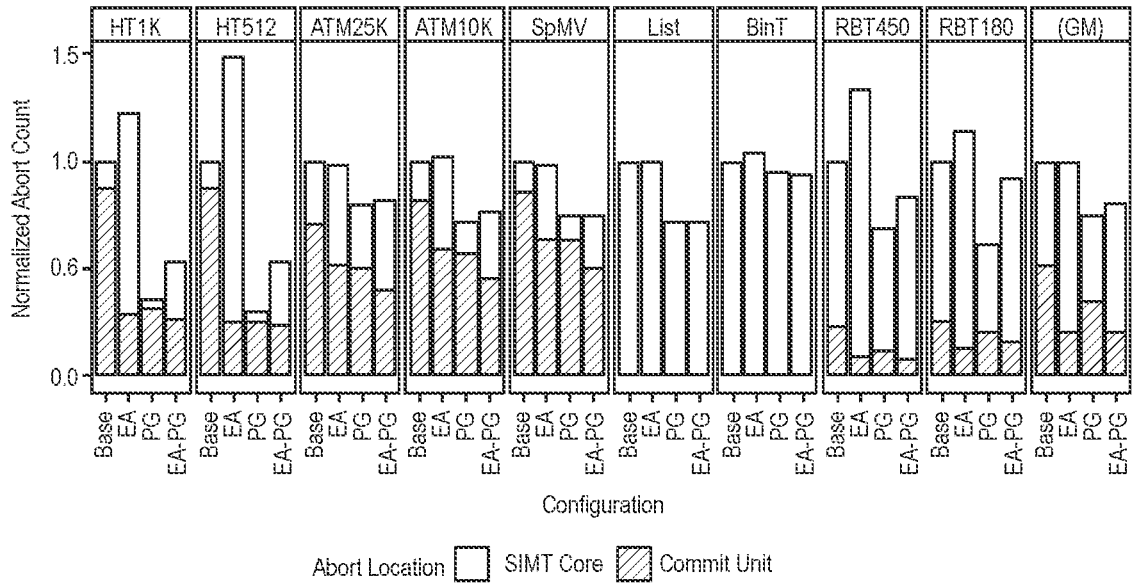
FIG. 10 illustrates an overall number of aborted transactions.

For List, Binary Tree (BinT) and Red-Black Tree (RBT450 and RBT180), Pause-and-Go execution scheme achieves similar or greater performance improvement than Early-Abort does. This may be because one or more of the following two reasons: (a) the three benchmarks spend a significant portion of time in transaction execution, rather than in the CU. Thus, the speedup from reduced transaction re-execution becomes more significant. FIG. 10 suggests that the absolute number of aborts are always reduced when Pause-and-Go is activated; (b) The three benchmarks are inherently more divergent than Hashtable, ATM, and SpMV, so branch divergence resulted from Pause-and-Go gets amortized with divergence, and do not affect the overall speedup much. With fewer transactions aborted (FIG. 10) and no significant increase in average transaction execution length (FIG. 12), the time spent on re-execution is decreased, resulting in overall speedup for List, Binary Tree and Red-Black Tree.

FIG. 13 shows the transactional part of Hashtable and Binary Tree. The Hashtable kernel does not have any if statements, so each thread executes the same code path. For Binary Tree, the data affects the code path executed by the threads in a warp and may cause branch divergence. This means that the length of transactions in Binary Tree is variable and may be much longer than that of a Hashtable even if the average transaction length is similar, making re-execution more costly. Also, the performance penalty caused by branch divergence resulting from pausing threads may be less significant in Binary Tree. This may be supported by FIG. 12, as the number of cycle per transaction for Binary Tree actually decreased.

In contrast, branch divergence induced by Pause-and-Go could cause transactions to run longer for HashTable. Applying either Early-Abort or Pause-and-Go reduces aborts at the CU to the same level for HashTable, but due, at least in part, to a longer average transaction length, Pause-and-Go does not deliver as much performance improvement as Early-Abort.

Combining Early-Abort and Pause-and-go Execution Scheme

According to the experimental results: (a) enabling both Pause-and-Go and Early-Abort yields a greater performance improvement in Hashtable (HT1K and HT512), Bank Account (ATM25K and ATM10K) and SpMV than enabling either approach individually. In these applications, the number of aborts at the CU is fewer than when enabling either approach individually; (b) Enabling both approaches in List gives the same improvement as enabling Pause-and-Go alone does. In fact, Early-Abort is never triggered in this benchmark; (c) Enabling both approaches in Red-Black Tree (RBT450 and RBT180) is not as good as enabling only Pause-and-Go. The reason may be, when Early-Abort and Pause-and-Go are enabled simultaneously, a performance penalty resulting from false positives would arise (non-conflicting transactions are wrongly aborted at the SIMT core). The penalty is re-execution which could be expensive, so the result is less optimal than when using Pause-and-Go alone.

The following rules may be used for applying either or both of Early-Abort and Pause-and-Go: (a) If the benchmark consists of large read/write sets (RedBlack tree, Binary Tree), apply Pause-and-Go execution scheme; (b) If the benchmark consists of mostly Type 1 conflicts and almost no conflicts of other 2 Types (example: List, Binary Tree), apply Pause-and-Go execution scheme; (c) If the benchmark consists of considerable amounts of Type 3 and 2 conflicts, apply Early-Abort; further, if it consists of short transactions with small read/write sets, apply both Pause-and-Go and Early-Abort.

Sensitivity to Table Size

Figure 14:
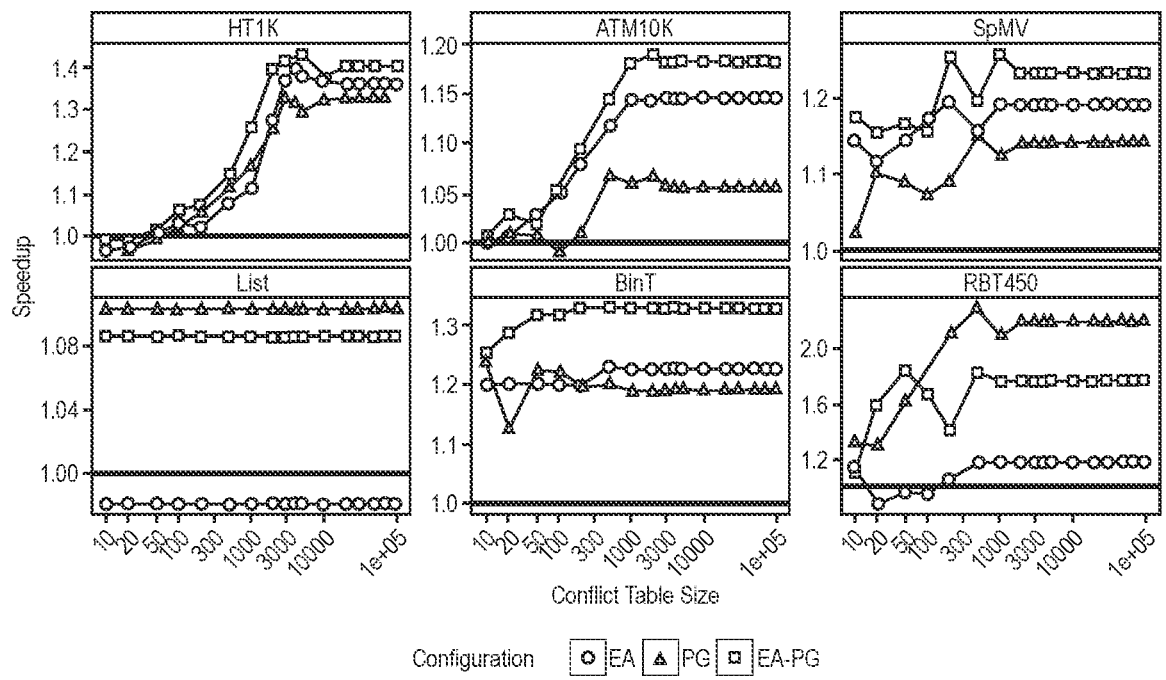
FIG. 14 illustrates the sensitivity of related speedup to table sizes.

Some simulations were performed in which sizes of CAT and RCT were varied. Such simulation may help determine how the performance improvement from applying either or both early conflict resolution methods changes. The sizes were varied from 10 through 100,000. The results for HT1K, ATM10K, SpMV, List, BinT and RBT450 are shown in FIG. 14. Overall, for all benchmarks except List, a larger table size gives greater performance improvement. Increase of speedup slows down after the table size exceeds around 1000 for SpMV and RBT450 or around 3000 for HT1K and ATM10K. This means the table size of 3000 is enough for tracking all the addresses touched by the concurrent transactions. For List, a very small table size (say 10) performs as well as a large table.

Interconnection Network Delay and Traffic

Figure 15:
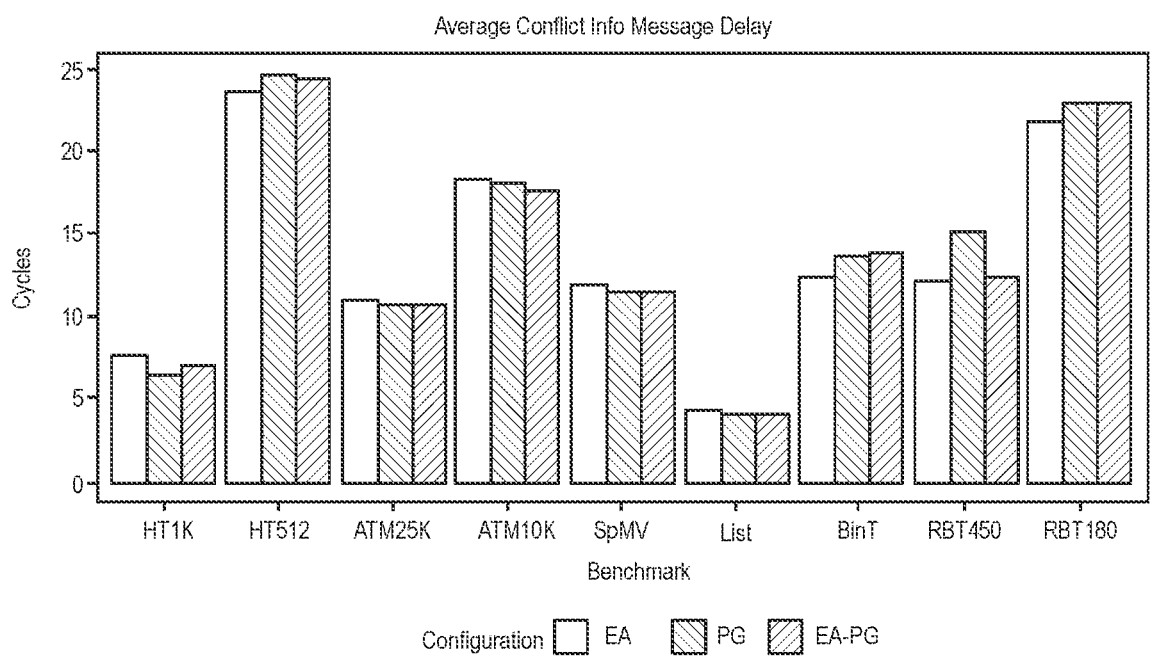
FIG. 15 illustrates an average message delay between the commit unit and the SIMT cores.

Early-Abort and Pause-and-Go relies on passing of conflict address information from the CUs to the SIMT cores. For the benchmarks, it takes 5 to 25 cycles for the conflict address messages to travel from the CUs to the SIMT cores, as is shown in FIG. 15. The results indicate that the delays are not directly related to the speedup. Depending on the benchmark, the ratio between the extra traffic and the original traffic ranges from less than 1% (in Binary Tree) to around 20% (in HT 1K). The size of the extra traffic is on par with the transferred logs.

Related Work

There are other proposals for GPU TM other than Warp TM and Kilo TM. Various software-based implementations exist that may perform as well as CPU counterparts. Efforts have gone into various aspects concerning the design of GPU TMs: (1) GPU-STM with encounter-time lock sorting to avoid deadlocks; (2) eager/pessimistic conflict detection on read/write operations; (3) noting that conflicts in hardware TM systems may cause performance losses due to aborts and extra communication a new cache miss state may be introduced that may help eliminate conflicts. With a similar goal, our two approaches aim at reducing aborts and communication between the SIMT core and the CUs.

There exist various proposals for accelerating transactional memory using hardware mechanisms: (1) TCache caches a shadow copy of transactional blocks, thus accelerating the re-execution for restarted transactions; (2) GTags, a hardware mechanism for fast access to transactional meta-data needed for conflict detection. Like both of these mechanisms, the Early-Abort approach also shortens the time to decide when to abort a transaction, thus accelerating transactions.

Another GPU proposal includes Staggered Transactions. Stagger Transactions puts a thread into wait mode when a data conflict is likely to happen, rather than abort the thread eagerly. In Staggered Transactions, threads decide when to pause themselves by accessing locks using non-transactional loads/stores in a transaction. Pause-and-Go execution scheme operates similarly but pauses threads from the warp scheduler's point of view, not from the scalar threads' point of view, due to the difference between GPU and CPU architectures.

CONCLUSION

Two early conflict resolution methods, Early-Abort and Pause-and-Go execution scheme, for GPU hardware TM systems are discussed herein. The approaches are based on making conflict information available to the SIMT cores for early conflict resolution, shortening the time required to abort conflicting transactions, and enabling pausing of a transaction to avoid performing a conflicting load/store. An evaluation showed the approaches reduced conflicts and CU contention, resulting in an average of 1.41× speedup at 0.8× energy consumption. The evaluation supports the effectiveness of utilizing information regarding conflicting transactions to resolve conflicts earlier than previous GPU TMs. This insight may be incorporated into future development of contention management and conflict resolution techniques on future TM systems involving GPUs.

What is claimed is:

1. A method performed by a compute device, the method comprising:
   accessing a conflicting address table (CAT) maintained on a per-core basis, the conflicting address table comprising a list of addresses of data correlated to read/write flags indicating whether the data at the listed address is currently being read or written to by a transaction, to access a first address of data affected by a first transaction to be committed at a commit unit (CU);
   comparing, by the core, the first address to a second address affected by a second transaction; and
   in response to determining the first address matches the second address, delaying or preventing validating the first transaction at the CU wherein delaying comprises pausing the first transaction to be executed by the core and preventing comprises aborting the first transaction to be committed by the core preventing the first transaction from reaching the CU for validation.

2. The method of claim 1, wherein comparing the first address to the second addresses is performed by performing a table look-up into the CAT during a log scanning process for the first transaction, and wherein aborting the first transaction prevents sending read/write sets of the first and second transactions to the commit unit.

3. The method of claim 1, wherein aborting the first transaction is further performed as a result of determining that the first and second transactions are not both exclusively read transactions.

4. The method of claim 1, wherein comparing the first address to the second addresses is performed by performing a table look-up into the CAT in conjunction with load/store instructions for the first transaction, and wherein the first transaction is paused if an address for the load/store instruction matches an entry in the CAT.

5. The method of claim 4, wherein control flow is returned to a thread for the first transaction once it is determined that one or more potentially conflicting transactions have committed.

6. The method of claim 5, wherein control flow is returned to the thread for the first transaction by referencing a log index column added to a core stack.

7. The method of claim 5, wherein control flow is returned to the thread for the first transaction by adding state to a core stack indicating that execution and validation should be retried for one or more threads, and copying entries in the stack having retries indicated to create a new entry in the core stack.

8. A computer system comprising:
   one or more hardware processors; and
   one or more computer-readable media having stored thereon instructions that are executable by the one or more processors to configure the computer system to implement a more efficient commit unit (CU), including instructions that are executable to configure the computer system to perform at least the following:

accessing a conflicting address table (CAT) maintained on a per-core basis, the conflicting address table comprising a list of addresses of data correlated to read/write flags indicating whether the data at the listed address is currently being read or written to by a transaction, to access a first address of data affected by a first transaction to be committed at the CU;

comparing, by the core, the first address to a second address affected by a second transaction; and in response to determining the first address matches the second address, delaying or preventing validating the first transaction at the CU wherein delaying comprises pausing the first transaction to be executed by the core and preventing comprises aborting the first transaction to be committed by the core preventing the first transaction from reaching the CU for validation.

9. The computer system of claim 8, wherein comparing the first address to the second addresses is performed by performing a table look-up into the CAT during a log scanning process for the first transaction, and wherein aborting the first transaction prevents sending read/write sets of the first and second transactions to the commit unit.

10. The computer system of claim 8, wherein aborting the first transaction is further performed as a result of determining that the first and second transactions are not both exclusively read transactions.

11. The computer system of claim 8, wherein comparing the first address to the second addresses is performed by performing a table look-up into the CAT in conjunction with load/store instructions for the first transaction, and wherein the first transaction is paused if an address for the load/store instruction matches an entry in the CAT.

12. The computer system of claim 11, wherein control flow is returned to a thread for the first transaction once it is determined that one or more potentially conflicting transactions have committed.

13. The computer system of claim 12, wherein control flow is returned to the thread for the first transaction by referencing a log index column added to a core stack.

14. The computer system of claim 12, wherein control flow is returned to the thread for the first transaction by adding state to a core stack indicating that execution and validation should be retried for one or more threads, and copying entries in the stack having retries indicated to create a new entry in the core stack.

15. A computer system for implementing transactional memory, the computing system comprising:

a plurality of Single Instruction Multiple Thread (SIMT) cores configured to process memory reads and writes for transactions;

for each of the SIMT cores, a conflicting address table (CAT) maintained by the corresponding SIMT core, the CAT storing word addresses for reads and writes by the SIMT cores correlated with flags indicating whether a corresponding word is written or read by a committing transaction, wherein the CATs for the different SIMT cores are coupled together by an interconnect;

a commit unit (CU) coupled to the SIMT cores configured to validate transactions; and wherein the SIMT cores are configured to:
access its CAT to access a first address of data affected by a first transaction to be committed at the CU;
compare the first address to a second address affected by a second transaction; and
in response to determining the first address matches the second address, delay or prevent validating the first transaction at the CU wherein delaying comprises pausing the first transaction to be executed by the core and preventing comprises aborting the first transaction to be committed by the core preventing the first transaction from reaching the CU for validation.

16. The computer system of claim 15, wherein the SIMT cores are configured to compare the first address to the second addresses by performing a table look-up into the CAT during a log scanning process for the first transaction, and wherein aborting the first transaction prevents sending read/write sets of the first and second transactions to the commit unit.

17. The computer system of claim 15, wherein the computing system comprises a graphical processing unit (GPU) transactional memory (TM).

18. The computer system of claim 15, wherein the SIMT cores are configured to compare the first address to the second addresses by performing a table look-up into the CAT in conjunction with load/store instructions for the first transaction, and wherein the first transaction is paused if an address for the load/store instruction matches an entry in the CAT.

19. The computer system of claim 15, further comprising a core stack, the core stack comprising a log index column used for identifying transactions to be restarted, once paused.

20. The computer system of claim 15, further comprising a core stack, the core stack comprising state indicating that execution and validation should be retried for one or more threads.

* * * * *